United States Patent [19]

Calderon

[11] 4,277,348

[45] Jul. 7, 1981

[54] METHODS FOR CLEANING A HELICAL SPRING FILTER

[75] Inventor: Reynaldo Calderon, Houston, Tex.

[73] Assignee: Texaco Inc., White Plains, N.Y.

[21] Appl. No.: 44,897

[22] Filed: Jun. 4, 1979

Related U.S. Application Data

[62] Division of Ser. No. 944,952, Sep. 22, 1978, Pat. No. 4,180,463.

[51] Int. Cl.³ .............................................. B01S 35/02
[52] U.S. Cl. .................................... 210/791; 166/231
[58] Field of Search .................... 210/77, 79, 107, 355, 210/393, 396, 397, 413–415, 407, 408, 497.1; 266/231–233, 265

[56] References Cited

U.S. PATENT DOCUMENTS

| | | | |
|---|---|---|---|
| 991,215 | 5/1911 | Kuhaida | 210/497.1 |
| 1,414,120 | 4/1922 | Fulcher | 210/415X |
| 2,022,017 | 11/1935 | Warble | 210/497.1 |
| 2,197,971 | 4/1940 | Elze et al. | 210/497.1 |
| 2,553,567 | 5/1951 | Fette | 210/414 X |
| 3,179,116 | 4/1965 | Jacobs | 210/497.1 |
| 3,616,914 | 11/1971 | Reid | 210/355 X |
| 3,754,651 | 8/1973 | Lannoch | 210/106 |
| 3,901,320 | 8/1975 | Calderon | 166/311 |
| 3,937,281 | 2/1976 | Harnsberger | 210/497.1 |

*Primary Examiner*—John Adee
*Attorney, Agent, or Firm*—Carl G. Ries; Robert A. Kulason; Theron H. Nichols

[57] ABSTRACT

A method for cleaning sand from a helical spring sand filter and a self-cleaning helical spring sand filter for use at the petroliferous unconsolidated sand strata of an oil well are disclosed. The filter comprises a helical spring connected in tension at each end to an elongated perforated sleeve for spacing apart all convolutions by a predetermined distance for forming the filter. One or more washer shaped cleaning rings with square holes therein are mounted between adjacent convolutions at one end of the spring for being rotated by a square ended rod supported by a sucker rod in a well between all of the convolutions to the spring other end for scraping off all foreign material from between the convolutions. The spring sand filter can be cleaned for as many times as there are cleaning rings instead of making trips to the surface for unclogging.

7 Claims, 4 Drawing Figures

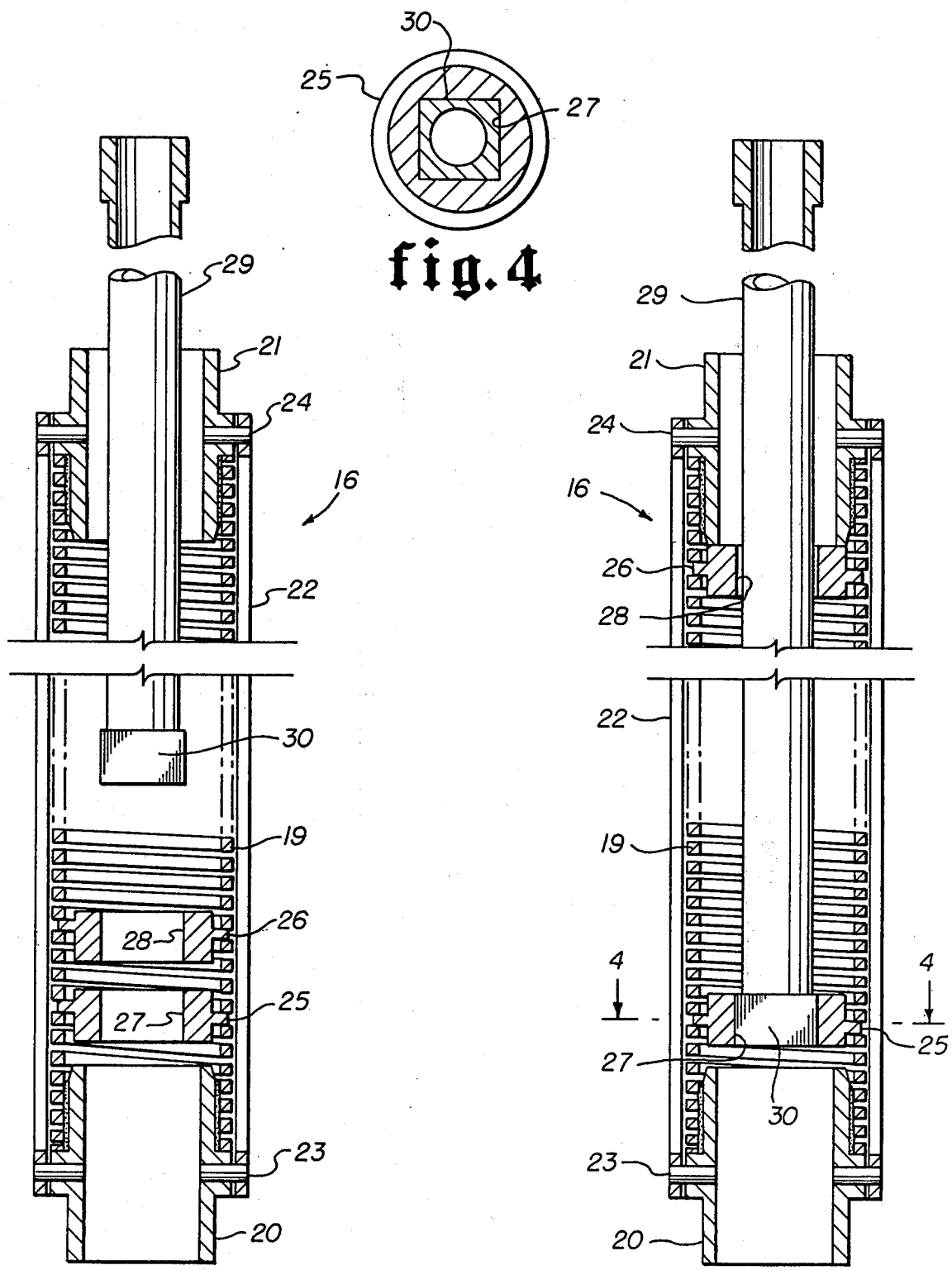

METHODS FOR CLEANING A HELICAL SPRING FILTER

This is a division of application Ser. No. 944,952 filed Sept. 22, 1978, now U.S. Pat. No. 4,180,463.

BACKGROUND OF THE INVENTION

Over the surface of the earth there are many thousands of oil wells that are drilled and completed in unconsolidated sand, i.e. crumbly sandstone. In such wells, sand does not necessarily precipitate to the bottom of the well, but instead may remain in suspension and is pumped up, if not free flowing, with the oil. As a result, most mechanical parts as valves, bearings, pistons, cylinders, etc. wear out prematurely under such conditions. Accordingly, the same must be filtered out from the oil, preferably in the well. Petroleum companies have spent large sums of money in trying to find a suitable solution to the sand problem, but heretofore there has been no satisfactory method or long lasting device for preventing the entry of said into the tube string and eventually into the suction pipe of the pump, or other works.

U.S. Pat. No. 2,837,032 discloses an oil well foam and wire coil filter, but that filter is quite sophisticated and expensive to manufacture, and is not adjustable to be opened for backwashing a cleaning liquid, as water, to clean the clogged filter. Another attempted solution was a spring filter as disclosed in U.S. Pat. No. 3,754,651, but because no spacers are apparent between the helical filter elements, the elements would have to be held in slight tension to separate the helical filter elements during filtering. Thus that filter could not be used as an oil well filter on which high compressive loads may be placed. Likewise no guide tube or mandrel can be utilized to strengthen the compressive capabilities for converting the filter to one for use in wells. Also, the spring filter of U.S. Pat. No. 3,179,116 is incapable of being strengthened to use in wells. Any compressive force on the triangular spring elements would cause them to collapse, and further the coined depressions for separating the spring elements would cause the spring elements to flex with a load thereon causing displacement of the adjacent coils and variation of the gauge therebetween.

Thus, new and better methods for filtering sand from an oil well, better methods for forming and assembling helical spring sand filters, and better self-cleaning helical spring sand filters are required for mounting on the lower end of a tubing string extending down into a well to the oil containing sand strata.

The disclosed inventions are improvements over U.S. Pat. No. 1,414,120 and those of Assignee's U.S. Pat. Nos. 3,901,320 (166-311) and 3,937,281 (166,233).

OBJECTS OF THE INVENTION

Accordingly, a primary object of this invention is to provide a method for cleaning a helical spring filter.

Another primary object of this invention is to provide a method for forming or assembling a self-cleaning helical spring filter.

Yet another primary object of this invention is to provide a new and better self-cleaning helical spring filter.

A further object of this invention is to provide a method for cleaning a helical spring filter and a mechanism for carrying out the method that is easy to operate, is of simple configuration, is economical to build and assemble, and is of greater efficiency for the filtering of sand out of oil deep in an oil well.

Other objects and various advantages of the disclosed method for cleaning a helical spring filter, method for forming or assembling a helical self-cleaning sand filter, and a self-cleaning helical sand filter will be apparent from the following detailed description, together with the accompanying drawings, submitted for purposes of illustration only and not intended to define the scope of the invention, reference being made for that purpose to the sujoined claims.

BRIEF DESCRIPTION OF THE DRAWINGS

The drawings diagrammatically illustrate by way of example, not by way of limitation, one form of the invention wherein like reference numerals designate corresponding parts in the several views in which:

FIG. 2 is a schematic diagrammatic longitudinal cross-section of the self-cleaning helical spring filter;

FIG. 3 is a sectional view similar to FIG. 2 illustrating the second cleaning ring being engaged for a second cleaning of the helical spring screen; and FIG. 4 is a sectional view taken at 4—4 on FIG. 3.

Figure 1:
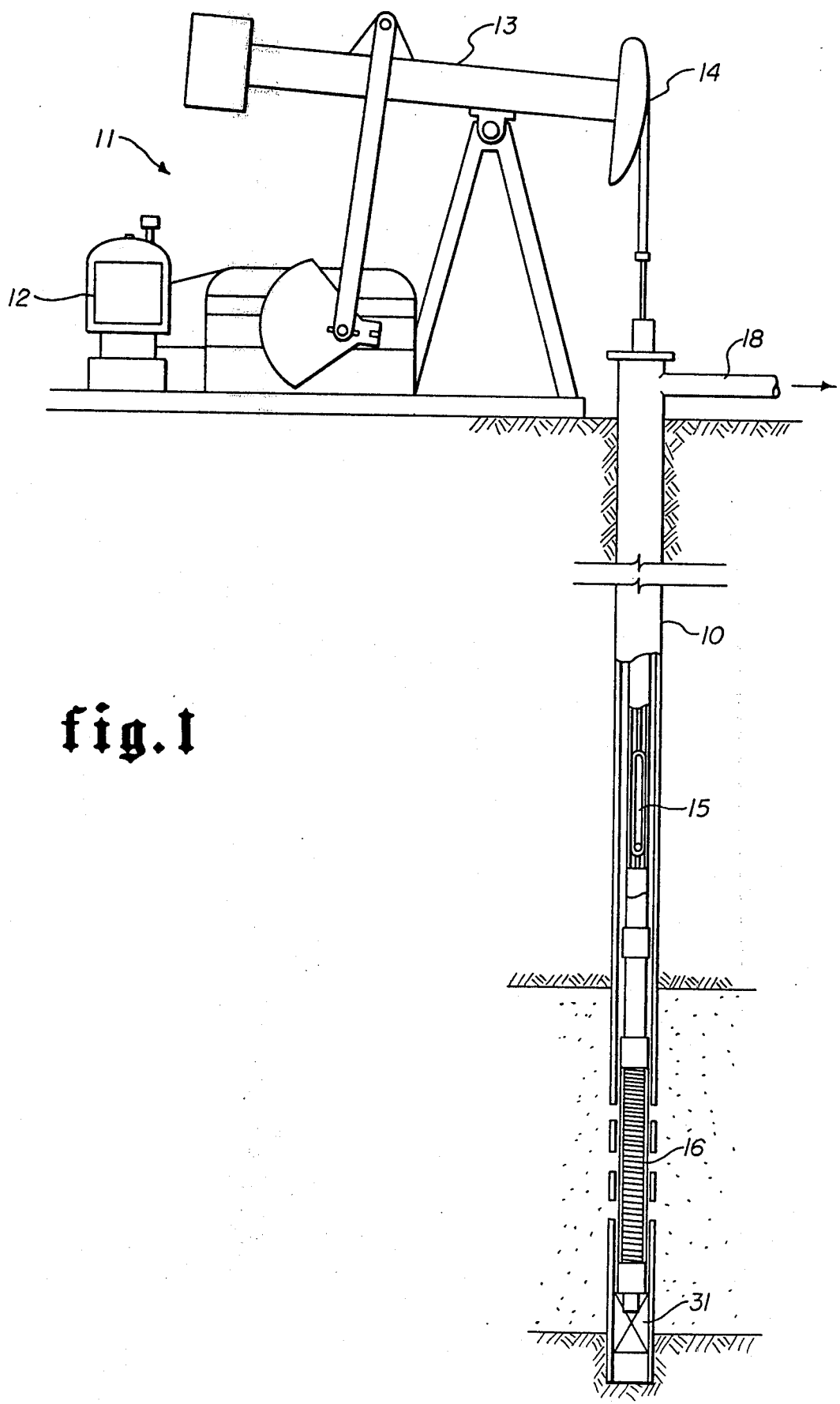
FIG. 1 is a schematic diagrammatic view with parts in section of the new sand filter as mounted in a typical oil well.

The invention disclosed herein, the scope of which being defined in the appended claims is not limited in its application to the details of construction and arrangements of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore all such modifications and variations which are within the spirit and scope of the invention herein are included and only such limitations should be imposed as are indicated in the appended claims.

DESCRIPTION OF THE INVENTION

This invention comprises a new method for cleaning a sand filter, a new method for forming or assembling a self-cleaning helical spring sand filter, and an apparatus comprising a new self-cleaning helical spring sand filter, particularly for use in an oil well.

METHOD FOR CLEANING A SAND FILTER

Briefly and basically, the new method for cleaning a helical spring sand filter (16) comprises the basic step of, (1) rotating a cleaning ring (26) between the adjacent spring convolutions from one end of the helical spring (19) sand filter to the filter other end for scraping off all foreign material from between the spaced apart spring convolutions.

This method step may be expanded to include, (1) rotating an elongated rod (29) with a polygon shaped end (30) extending through the helical spring filter, and (2) rotating, consecutively, each of a plurality of cleaning rings with corresponding polygon shaped holes therein between the adjacent spring convolutions from one end of the helical spring filter to the filter other end with the polygon shaped rod end protruding therein for scraping off all foreign material from between the spaced apart spring convolutions for as many times as there are polygon shaped cleaning rings.

THE PREFERRED EMBODIMENT FOR PRACTICING THE INVENTION

The above methods for cleaning a helical spring sand filter may be performed by other mechanisms than that disclosed in the FIGURES. The mechanism disclosed herein may be operated by or made by other methods than those disclosed, as by hand. However, the preferred system for performing the method is disclosed in FIG. 2.

ARTICLES FOR PERFORMING THE METHODS

Self-cleaning helical spring filters are disclosed in the drawings that may be made by other methods, as by hand.

FIG. 1 is a schematic diagrammatic view of a typical producing oil well 10 having pumping equipment 11 comprising motor means 12 for actuating walking beam 13 with horse head 14 for operating pump 15 in the well. A crude oil pump is utilized after free flow has ceased for raising the oil that has passed through the filter 16 from the petroliferous unconsolidated sand 17 up to the surface to exit from discharge pipe 18. Except for the filter 16, all of the above parts may be conventional elements.

FIG. 2 illustrates a schematic enlarged sectional view of the preferred modification of the new self-cleaning helical spring filter 16 for performing the above described methods. This filter 16, FIG. 2, comprises a helical square spring 19, two short inner sleeves 20, 21, one large outer sleeve 22, a plurality of cleaning rings or washers 25, 26, having square holes 27 and 28, respectively, and a long cleaning ring rotating rod 29.

While various shapes may be utilized for the wire or bar stock for forming the spring 11, square bar stock is preferred in this case. After the helical spring is formed and cut to a precise length, each end is welded to a short inner sleeve 20 and 21, respectively, FIG. 2. The lower end of the spring 11 is secured to the lower end of an elongated, perforated outer sleeve 22, as by a pin 23 connecting the short inner sleeve 20 to the lower end of the elongated sleeve 22. While this outer sleeve 22 may have holes, slots, or openings of various shapes therein to permit the oil to flow through from the formation to the screen of filter 16, the disclosed perforated outer sleeve comprises a wide metal band wound around and formed to the desired diameter, with a ring at each end, if so desired, to maintain its fixed diameter. Then the other spring end is twisted until the helical spring 19 slides freely in outer sleeve 22 and expanded to provide the exact predetermined spacing between the convolutions for screening of the sand or other foreign material before a hole is drilled in the outer sleeve upper end and a pin 24 inserted.

A packer 31 is rigidly secured to the lower end of outer sleeve 22 in the well 10 adjacent the strata of petroliferous unconsolidated sand 17, FIG. 1.

Next, one or more cleaning rings 25, 26, FIG. 2, are inserted in the lower end of the helical spring between two adjacent convolutions, if not threaded in the end prior to welding on of the lower short inner sleeve 20.

When the conventional filter becomes clogged with sand or other foreign material, it is raised to the top of the well, cleaned, and then lowered again. Instead in this filter, an elongated round bar 29, FIG. 2, with a square end or head 30 is lowered from a sucker rod above and inserted first into the square hole 28. Upon rotation of the elongated round bar 29 and immediate lifting thereof, the speed of lift being controlled by the rate of rotation, the cleaning ring 26 scrapes and cleans between all the spring convolutions to the other end or top of the helical spring where it comes to a stop against the other inner sleeve 21. While the head 30 of the round bar 29 is square, the rest of the bar is round of reduced diameter so that rotation thereof does not affect the cleaning rings already stowed at the upper end of the helical spring.

During cleaning of the helical spring convolutions, the filtered fluid following the cleaning ring 26 continues to rise with the cleaning ring as it rotates from the lower end to the upper end of the helical spring screen. There, the filtered liquid passes between the reduced round portion 29 of the bar and the larger square opening 27 in the ring to continue on up to the surface.

When the filter has become clogged again with sand or other foreign material, the square headed elongated bar is again lowered into the well to protrude through the cleaning ring at the top of the helical spring filter to pass down to enter the next remaining cleaning ring. After the square head 30 is positioned in the square hole of the next cleaning ring, as ring 25, then the rod is rotated and lifted as the next cleaning ring is rotated between all helical spring convolutions to the other end or top, the rod rotation stopped, and the rod lifted from the well.

While a square shape for the cleaning ring hole 28 and the corresponding bar head 30 is preferred, this shape may take the form of any other desired shaped polygon, if so desired.

Accordingly, it will be seen that while a method for cleaning a helical spring filter is new and different, it will operate in a manner which meets each of the objects set forth hereinbefore.

While only one method of the invention has been disclosed, it will be evident that various methods and modifications are possible in the arrangement and construction of the disclosed methods and helical spring filter without departing from the scope of the invention and it is accordingly desired to comprehend within the purview of this invention such modifications as may be considered to fall within the scope of the appended claims.

I claim:
1. A method for cleaning a helical spring filter having its convolutions spaced apart a predetermined distance for the passage of filtrate therebetween comprising,
 (a) rotating an annular cleaning ring means between the adjacent helical spring convolutions from one end of the helical spring filter to the filter's other end for scraping off foreign material from between the spaced apart spring convolutions, and
 (b) passing the filtrate axially through the middle of the annular ring means for continued filtering between the spring convolutions after being cleaned.
2. A method as recited in claim 1 including the steps of,
 (a) rotating an elongated rod extending through the helical spring filter, and
 (b) rotating the annular cleaning ring means between the adjacent helical spring convolutions from one end of the helical spring filter to the filter other end with the rotating elongated rod for scraping off all foreign material from between the spaced apart spring convolutions.

3. A method as recited in claim 1 including the step of,
 (a) rotating consecutively each of a plurality of annular cleaning ring means between the adjacent helical spring convolutions from one end of the helical spring filter to the filter other end for scraping off all foreign material from between the spaced apart spring convolutions.

4. A method as recited in claim 1 including the steps of,
 (a) rotating an elongated rod extending through the helical spring filter, and
 (b) rotating, consecutively, each of a plurality of annular cleaning ring means between the adjacent helical spring convolutions from one end of the helical spring filter to the filter other end with the rotating elongated rod for scraping off all foreign material from between the spaced apart spring convolutions for as many times as there are cleaning ring means.

5. A method as recited in claim 1 including the steps of,
 (a) rotating an elongated rod with a polygon shaped end extending through the helical spring filter, and
 (b) rotating, consecutively, each of a plurality of annular cleaning rings with corresponding polygon shaped holes therein between the adjacent helical spring convolutions from one end of the helical spring filter to the filter other end with the polygon shaped rod end secured therein for scraping off all foreign material from between the spaced apart spring convolutions for as many times as there are polygon shaped cleaning rings.

6. A method for cleaning a helical spring filter having its convolutions spaced apart a predetermined distance for the passage of filtrate therebetween comprising,
 (a) rotating an annular cleaning means between the adjacent helical spring convolutions from one end of the helical spring filter to the other filter end for scraping off the foreign material from between the spaced apart helical spring convolutions, and
 (b) passing the filtrate axially through the middle of the annular cleaning means for then filtering between the spring convolutions after the annular cleaning means has completed the cleaning trip to one end of the filter for storage.

7. A method for cleaning a helical spring filter having its convolutions spaced apart a predetermined distance for the passage of filtrate therebetween comprising,
 (a) rotating an annular cleaning means between the adjacent helical spring convolutions from one end of the helical spring filter to the filter's other end for scraping off the foreign material from between the spaced apart helical spring convolutions,
 (b) disengaging the annular cleaning means from a rotating means after cleaning of the spring convolutions, and
 (c) passing the filtrate axially through the middle of the annular cleaning means for continued filtering between the spring convolutions after being cleaned.

* * * * *